Sept. 10, 1946.                F. S. KINKEAD                    2,407,286
                             COMMUNICATION SYSTEM
                         Filed Nov. 7, 1942          3 Sheets-Sheet 1
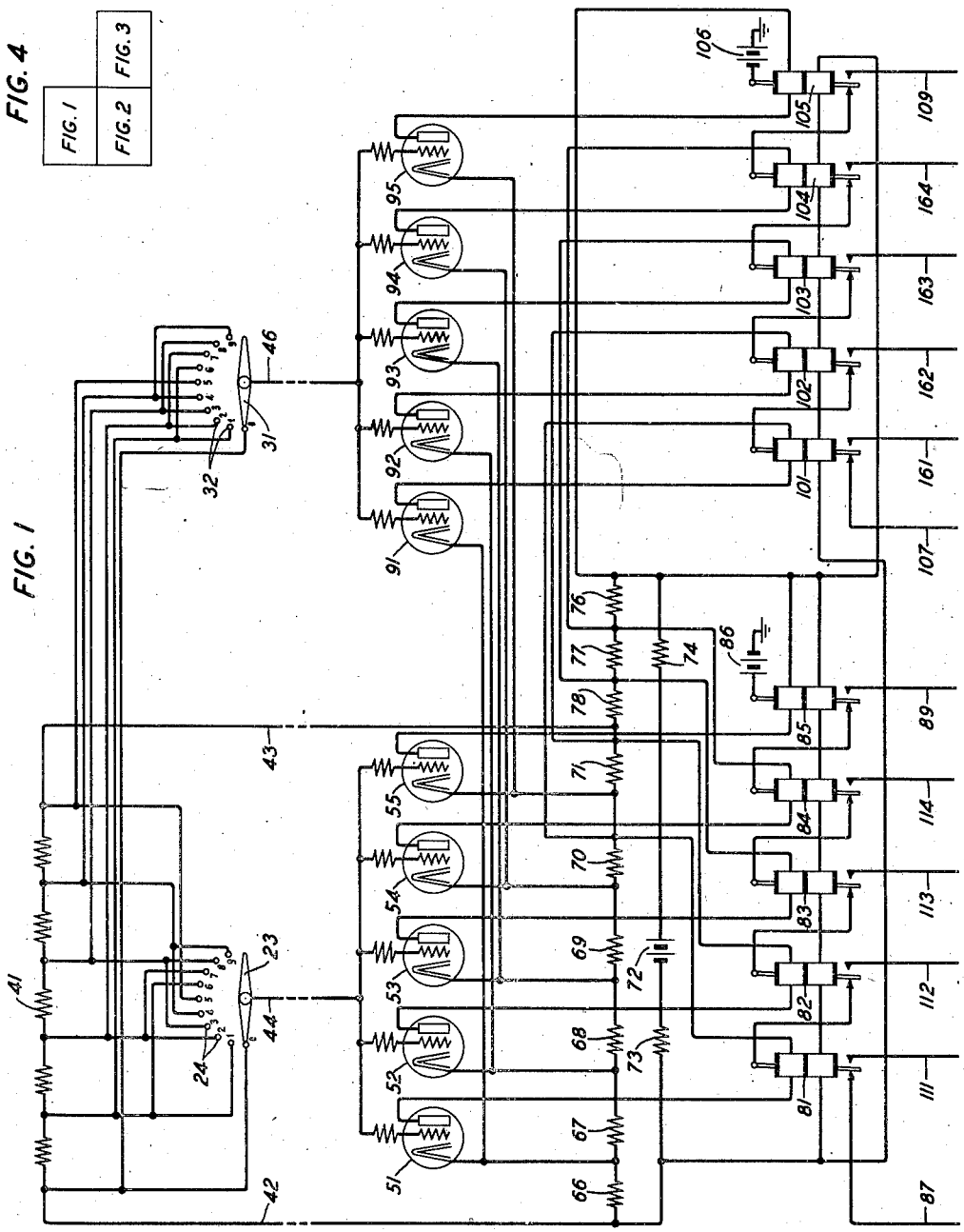
INVENTORS: F. S. KINKEAD, DECEASED
RITA S. KINKEAD
HIS ADMINISTRATRIX
G. A. LOCKE
BY R. C. Terry
ATTORNEY

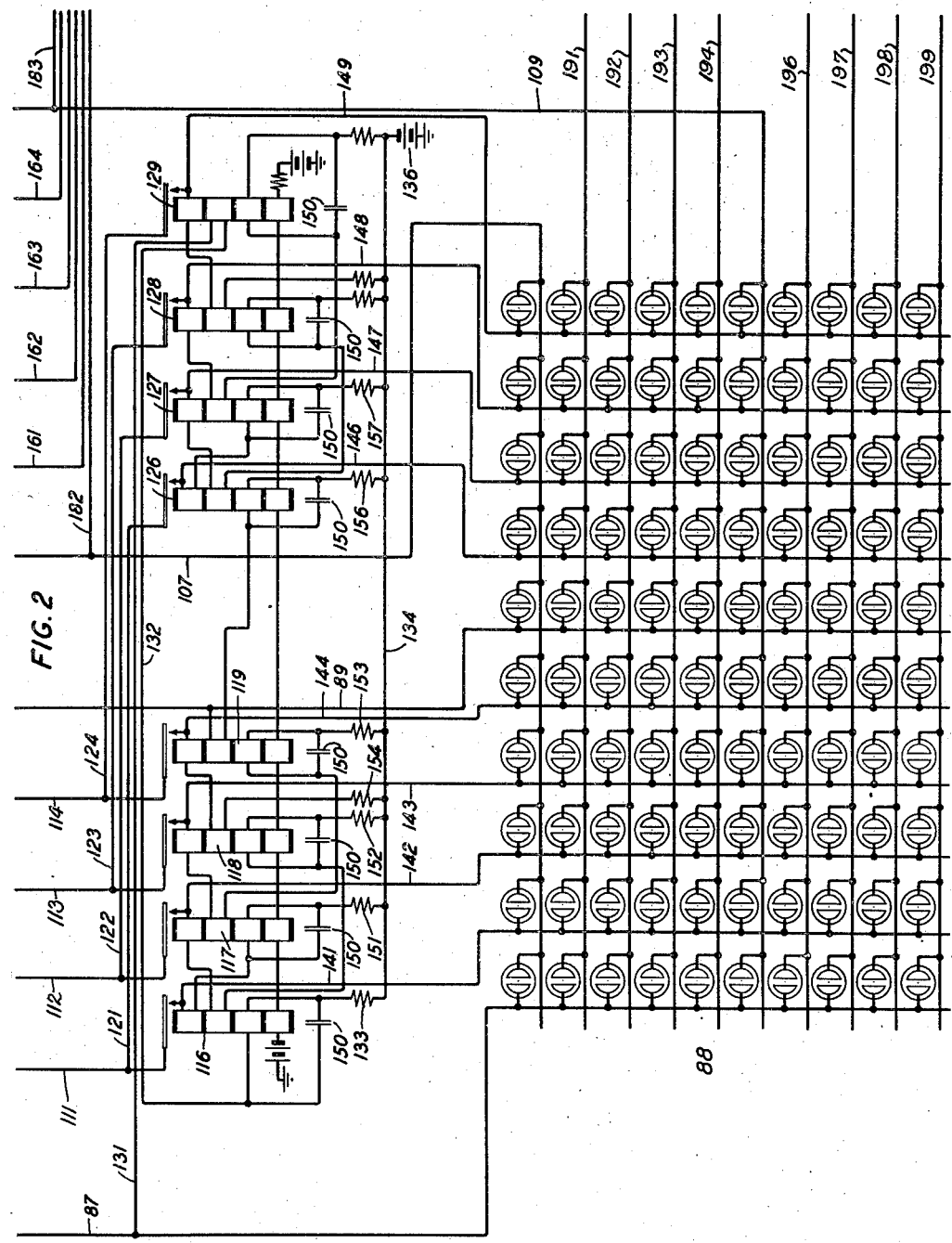

Sept. 10, 1946.   F. S. KINKEAD   2,407,286
COMMUNICATION SYSTEM
Filed Nov. 7, 1942   3 Sheets-Sheet 3
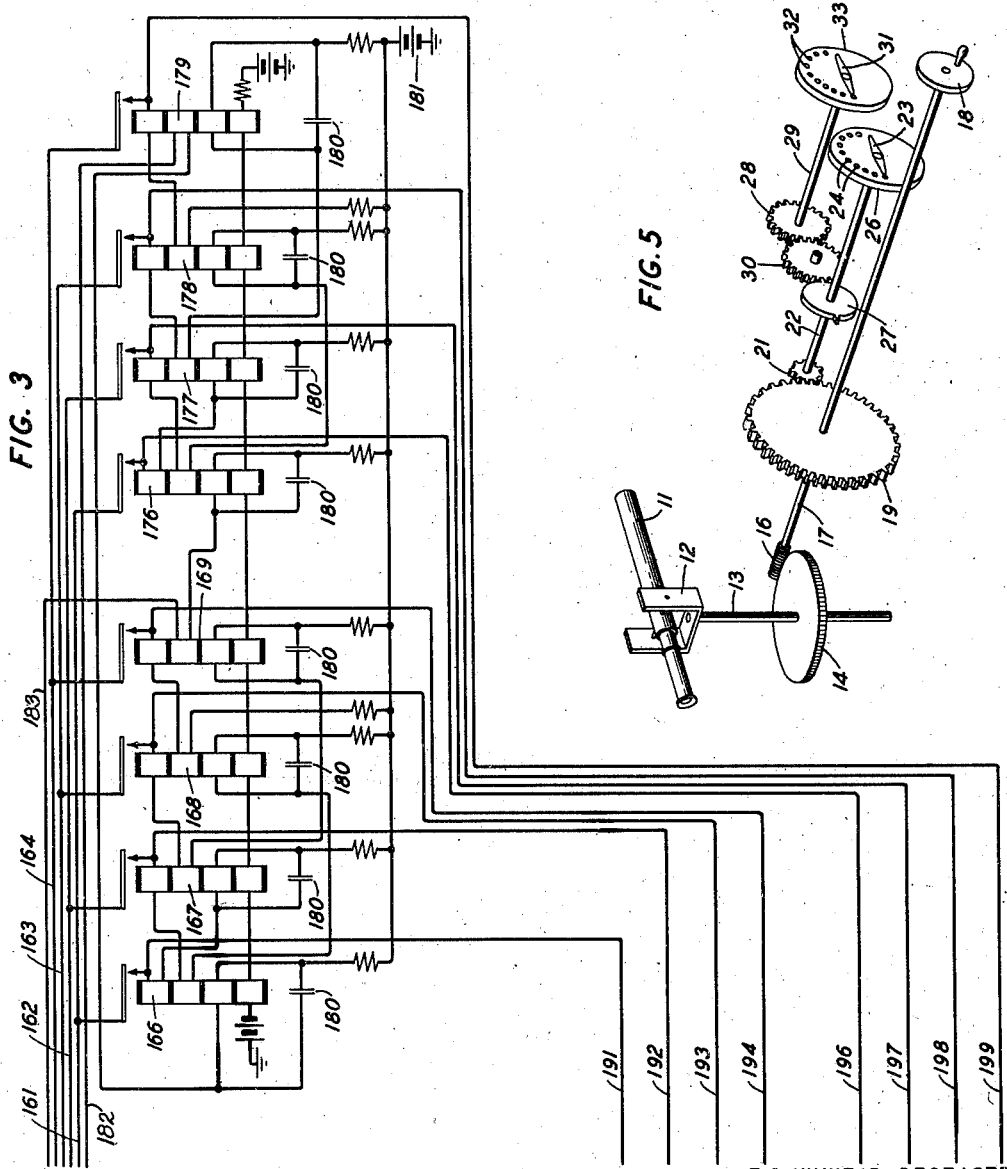
INVENTORS: F. S. KINKEAD, DECEASED
RITA S. KINKEAD
HIS ADMINISTRATRIX
G. A. LOCKE
BY R. C. Terry
ATTORNEY

Patented Sept. 10, 1946

2,407,286

UNITED STATES PATENT OFFICE 2,407,286

COMMUNICATION SYSTEM

Fullerton S. Kinkead, deceased, late of New York, N. Y., by Rita Smith Kinkead, administratrix, Trudau, N. Y., and George A. Locke, Glenwood Landing, N. Y., assignors to Bell Telephone Laboratories, Incorporated, New York, N. Y., a corporation of New York Application November 7, 1942, Serial No. 464,846

4 Claims. (Cl. 177—353)

This invention relates to communication systems and particularly to systems for the transmission of data representing the readings of variably settable registering instrumentalities.

An object of the invention is to transmit data by means of a potential divider and to detect the various or varying potentials thereby afforded by means of potential responsive devices interrelated on a potential gradient basis.

Another object of the invention is to employ electron discharge tubes as the detectors of potentials representing the readings of the registering instrumentalities.

Another object of the invention is to employ a lesser number of potential responsive devices than the number of values of data in a fundamental range without resorting to permutational control of the potential responsive devices.

Another object of the invention is to transmit data representing readings involving multiple characters or digits by a multiple derivation of potentials from a single potential divider.

The invention features the display of any data representation of a fundamental range of data representations under the control of a potential divider affording a lesser number of fixed values of potentials than the number of data representations in the fundamental range, through the agency of a lesser number of electron discharge devices than the number of data representations in the range, controlling a relay individual to each discharge device, the relays in turn controlling other relays the number of which is intermediate the number of discharge devices and the number of data representations in the fundamental range.

In accordance with the preferred embodiment of the invention, at the transmitting station, a registering instrumentality, such as an optical instrument for following the movement of a moving object, is rotatable upon an axis by means of a crank preferably geared to impart one degree of angular movement of the optical instrument for each revolution of the crank. Switch arms are connected through gearing to the crank shaft to be rotated thereby and each switch arm cooperates with a bank of contacts containing ten contacts. One of the switch arms traverses its bank of contacts ten times for each revolution of the crank so that each contact represents one one-hundredth of a revolution of the crank. The other switch arm traverses its bank of contacts once for each revolution of the crank so that each contact represents one-tenth of a revolution of the crank.

A potential divider having six fixed potential points has these points connected to the first six contacts of each switch bank and has four of the six points connected to the remaining four contacts of each bank. A pair of voltage supply conductors extends from the ends of the potential divider to the receiving station where a source of potential is connected between the conductors. A conductor extends from the switch arm of each switch to the receiving station where the control electrodes of two sets of five electron discharge devices are connected to the two switch arm conductors.

At the receiving station a potential divider having fixed potential points is connected across the source of potential and the cathodes of the electron discharge tubes of each set are connected to the several fixed potential points so that the tubes in each set have progressively greater negative bias. Since the control electrodes of all of the tubes in each set receive like potentials over the switch arm conductors from any contact of the two switches, none, one, or more tubes of each set will be rendered conductive depending on the instantaneous values of control electrode potentials of the tubes of each set relative to their progressively different cathode potentials. From no tube to five tubes of each set may be rendered conductive, thus providing six selective conditions for the first six contacts of each switch. The remaining four contacts of each switch provide potentials which duplicate four of these afforded by the first six contacts and thus provide four repeated selective conditions of the electron discharge tubes.

Each set of five relays controlled by five electron discharge tubes in turn controls a set of eight counting relays. The counting relays prepare circuits for the lighting of indicator lamps. There are preferably one hundred lamps which may be arranged in any convenient pattern such as ten rows of ten lamps, and each lamp has one terminal connected to one conductor of a set of ten bus bar conductors and the other terminal connected to one conductor of another set of ten bus bar conductors, there being ten lamp connections to each bus bar conductor and each lamp being operable upon the connection of a source of potential to the two bus bar conductors to which the lamp is connected.

Referring to either set of discharge tube controlled relays, counting relays and bus bar conductors, because they are substantially identical, one bus bar conductor is electrified directly under the control of the discharge tube controlled relays when none of those relays is energized, one bus bar conductor is electrified directly under the control of those relays when all five of the relays of a set are energized and the remaining eight bus bar conductors become electrified selectively through paths prepared by the eight counting relays of a set. Only one bus bar conductor of each set may be electrified at any instant and thus only one lamp will be lighted at any instant, this lamp being determined by the setting of the hundredths degree switch and the setting of the tenths degree switch at the transmitting station.

Referring again to either set of counting relays, the relays thereof are so interrelated that at all times a minimum of two relays are energized and under some circumstances three relays are energized. Specifically, when none of the electron discharge tube controlled relays of a set is energized the first and last counting relays of the set are energized. When all of the discharge tube controlled relays of a set are energized the fourth and fifth counting relays are energized. Under certain other conditions of the discharge tube controlled relays, which conditions are with one or four relays energized, two of the counting relays of a set are simultaneously energized. With the remaining possible conditions, namely, two or three of the discharge tube controlled relays energized, three of the counting relays are energized. The counting relays prepare conductive paths for electrification of the bus bar conductors, and since the counting relays, by virtue of the multiple energization, will count in either direction, they will choose bus bar conductors successively in ascending or descending order and will reverse at any time that the direction of operation of the switches at the transmitting station is reversed. As previously mentioned, the selective conditions of the electron discharge tubes for the last four contacts of the switch at the transmitting station duplicate four of the first six contacts of the switch. These conditions are represented by activation of one, two, three or four of the electron discharge tubes and energization of the corresponding relays which they control. For these four conditions, only one of which may exist at any instant, either the first four counting relays of a set or the last four counting relays of a set control electrification of their associated bus bar conductors, the two subsets of four counting relays being operably effective alternately as the counting operation progresses in either direction. With the foregoing arrangement, during one revolution of the crank associated with the optical instrument at the transmitting station to rotate the instrument through an angle of one degree one set of counting relays will go through a complete cycle of operation ten times and will sequentially electrify the bus bar conductors of one set ten times. The other set of counting relays will go through one cycle of operation and will electrify each of the bus bar conductors in the other set once so that the one hundred lamps will be illuminated and extinguished successively in a definite order to display visually the progress of the optical instrument through one degree of angular movement.

For a complete understanding of the invention reference may be had to the following detailed description to be interpreted in the light of the accompanying drawings wherein:

Fig. 1 is a circuit diagram showing the electrical system at the transmitting station for generating signaling conditions representing readings of a registering instrumentality and also showing apparatus at the receiving station for detecting and interpreting the signaling conditions;

Fig. 2 is a circuit diagram showing a counting relay circuit for further interpreting one digit of the received reading of a registering instrumentality and also showing a display board partially controlled by the counting relay circuit;

Fig. 3 is a circuit diagram showing a similar counting relay circuit for further interpreting another digit of the received reading of the registering instrumentality and for further controlling the display board;

Fig. 4 is a diagrammatic view showing how Figs. 1, 2 and 3 may be arranged to show the entire electrical system of the transmitting and receiving stations; and Fig. 5 is a schematic perspective view showing mechanical details of the data registering instrumentality at the transmitting station.

Division application, Serial No. 501,125, filed September 3, 1943, by F. S. Kinkead contains claims directed to novel features of the counting relay system shown in Figs. 2 and 3.

Referring now to the drawings and particularly to Fig. 5 the reference numeral 11 designates an optical device through which a distant object may be observed. Optical device 11 is supported by horizontally extending trunnions in a U-shaped bracket 12 which is secured to a vertically extending shaft 13. Shaft 13 is keyed or otherwise secured to a worm wheel 14 which is engaged by a worm 16 secured to a shaft 17. The ratio between worm wheel 14 and worm 16 is preferably 360 to 1 so that optical device 11 is moved through an angle of one degree in a horizontal plane for each revolution of shaft 17.

Shaft 17 has secured thereto a crank wheel 18 by means of which rotation may be imparted to the shaft, and also has secured thereto a gear 19. A gear 21 secured to a shaft 22 meshes with gear 19 so that shaft 22 will be driven when shaft 17 is rotated and gear 21 is preferably smaller than gear 19 in a ratio of 1 to 5 so that five revolutions will be imparted to shaft 22 for each revolution of shaft 17. Shaft 22 has secured thereto a double-ended switch arm 23 which wipes across a bank of contacts 24 of which there are ten, arranged in slightly less than a semicircle on a stationary insulating disc 26. Thus for each revolution of shaft 17 both ends of the double-ended brush arm 23 will traverse the bank of contacts 24 five times for a total of ten traversals of the ten contacts 24. Shaft 22 also has secured thereto a gear 27 having only two diametrically opposed teeth for imparting intermittent rotation through an idler gear 30 to a gear 28 carried by a shaft 29. Gear 28 is preferably of the same effective diameter as gear 27 and has twenty teeth so that twice in each revolution of gear 27 gear 28 will be rotated through the angular distance of one tooth or one-twentieth of a revolution. Since gears 27 and 28 are of the same effective diameter the angle of rotation of gear 27 during which it is imparting one-twentieth of a revolution of movement to gear 28 will also be one-twentieth of a revolution.

Shaft 29 has secured thereto a double-ended switch arm 31 which wipes across the substantially semicircular array of ten contacts 32 supported by a stationary insulating disc 33. Since shaft 29 is driven from shaft 22 at the rate of one-twentieth revolution for each half revolution of shaft 22, shaft 29 will be rotated one-half revolution for each five revolutions of shaft 22 and the contacts 32 will have been traversed once by one end of the double-ended switch arm 31 for ten traversals of the bank of contacts 24 by the two ends of switch arm 23. From this it will be apparent that advancement of one end of switch arm 23 from one to another of the contacts 24 represents one-hundredth of a revolution of shaft 17 and advancement of one end of switch arm 31 from one to another of the contacts 32 represents one-tenth of a revolution of shaft 17. The two ends of the two switch arms 23 and 31 cannot engage the end contacts of the respective banks simultaneously, there being an offset equal to the mounting centers of the contacts. The orientation of the two-toothed gear 27 on shaft 22 is preferably such that switch arm 31 is moved from one contacct to the next while one end of switch arm 23 is moving out of engagement with the last contact of bank 24 and the other end of the switch arm is moving into engagement with the other end contact of the bank.

As indicated in Fig. 1 there is located at the transmitting station a potential divider 41 which may comprise a single resistor winding having a plurality of taps or may comprise a plurality of individual resistors serially connected. From the terminals of potential divider 41 conductors 42 and 43 extend to the receiving station. The individual contacts of the bank 24 have been designated 0 to 9, inclusive, and it will be noted that the end terminals of potential divider 41 are connected to the terminals 0 and 5 of contact bank 24 and to the terminals 0 and 5 of contact bank 32. The four tap points of potential divider 41 are connected to contacts 1, 2, 3 and 4 and to contacts 6, 7, 8 and 9 of switch bank 24 and to contacts 1, 2, 3 and 4 and contacts 6, 7, 8 and 9 of switch bank 32. A conductor 44 extends from switch arm 23 to the receiving station and a conductor 46 extends from switch arm 31 to the receiving station.

At the receiving station conductor 44 is connected to the control electrodes or grids of five electron discharge tubes 51, 52, 53, 54 and 55. A potential divider comprising serially connected resistors 66, 67, 68, 69, 70 and 71 is connected between the conductors 42 and 43 at the receiving station. A battery 72 or other source of direct current potential has its negative terminal connected through a resistor 73 to conductor 42 and has its positive terminal connected through resistors 74, 76, 77 and 78 to conductor 43. Assuming that the conductors 42 and 43 have negligible resistance substantially the same potential will be impressed across potential divider 41 as is impressed across the potential divider comprising resistors 66 to 71, inclusive. The cathode of tube 51 is connected to the junction of resistors 66 and 67 so that the cathode is more positive than conductor 42 and the left-hand terminal of potential divider 41 by the potential difference across resistor 66. The cathode of tube 52 is connected to the junction of resistors 67 and 68 so that the cathode of the tube will be more positive than that of tube 51 by the potential difference across resistor 67 and will be more positive than the potential of conductor 42 by the total potential difference across resistors 66 and 67. Similarly, the cathode of tube 53 is connected to the junction of resistors 68 and 69, the cathode of tube 54 is connected to the junction of resistors 69 and 70 and the cathode of tube 55 is connected to the junction of resistors 70 and 71 so that the cathode of each tube is progressively more positive than the cathode of the tube preceding it. Conductor 43 is more positive than the cathode of tube 55 by the potential difference across resistor 71.

The anode of tube 51 is connected through the upper winding of an electrically biased relay 81 to the junction of resistors 70 and 71. Thus the anode of tube 51 is more positive than the cathode by the total potential difference across resistors 67, 68, 69 and 70. The anode of tube 52 is connected through the upper winding of electrically biased relay 82 to the junction of resistors 71 and 78 which affords a higher positive potential for the anode of tube 52 than the cathode of that tube has. Similarly, the anodes of tubes 53, 54 and 55 are connected through the upper windings of relays 83, 84 and 85, respectively, to the junction of resistors 78 and 77, 77 and 76, and to the junction of resistors 76 and 74, respectively.

The several resistive sections of potential divider 41 are so proportioned and the potential differences across resistors 66, 67, 68, 69 and 70 are such that when switch arm 23 engages the zero contact of bank 24 none of the tubes 51 to 55 will pass sufficient anode current to operate any of the relays 81 to 85. When switch arm 23 engages the contact 1 of bank 24 the grids of tubes 51 to 55 will be made less negative with respect to their cathodes and tube 51 will be rendered sufficiently conductive to operate relay 81. When switch arm 23 engages contact 2 of bank 24 tube 52 will be rendered sufficiently conductive to operate relay 82, tube 51 remaining conductive because its grid is made still less negative with respect to its cathode. As switch arm 23 engages contacts 3, 4 and 5 of bank 24 in succession, tubes 53, 54 and 55 will be rendered conductive in succession to operate relays 83, 84 and 85, respectively, so that when the switch arm engages contact 5 all of the tubes 51 to 55 will be conductive and all of the relays 81 to 85 will be operated. When switch arm 23 moves into engagement with contact 6 of bank 24 the grids of tubes 51 to 55 will be reduced to the same potential that they had when the switch arm engaged contact 1 and tubes 52 to 55 will be cut off, leaving only tube 51 conductive and only relay 81 operated. As switch arm 23 successively engages contacts 7, 8 and 9 of bank 24, tubes 52, 53 and 54 will be rendered conductive in succession and relays 82, 83 and 84 will again be operated. As switch arm 23 moves out of engagement with contact 9 of bank 24 and into engagement with the zero contact all of the tubes 51 to 55 are cut off or are rendered insufficiently conductive to operate the relays 81 to 85, inclusive, so that the armatures of those relays are restored to their left-hand contacts. From the foregoing it will be apparent that tubes 51 to 55, inclusive, are all cut off only when switch arm 23 engages the zero contact and are all conductive only when the switch arm engages contact 5. Tubes 51 to 54 are rendered conductive in succession as switch arm 23 traverses contacts 1 to 4, inclusive, and again as the switch arm traverses contacts 6 to 9, inclusive.

Conductor 46 extending from switch arm 31 at the transmitting station is connected to the grids of five tubes 91, 92, 93, 94 and 95 at the receiving station. The cathodes of these tubes are connected to the cathodes of tubes 51 to 55, inclusive, respectively so that the cathodes of tubes 92 to 95, inclusive, are progressively more positive than the cathode of tube 91 to the same degree that the cathodes of tubes 52 to 55, inclusive, are more positive than the cathode of tube 51. The anodes of tubes 91 to 95, inclusive, are connected through the operating windings of electrically biased relays 101, 102, 103, 104 and 105, respectively, to the same connection points in the series of resistors 70, 71, 78, 77, 76, and 94 as are the anode paths of the tubes 51 to 55, inclusive, so that the anode of each of the tubes 91 to 95, inclusive, is uniformly more positive than its cathode in the same degree as the tubes 51 to 55, inclusive.

Since the connections of the contacts of switch bank 32 to the potential divider 41 are the same as those of the switch bank 24, tubes 91 to 95, inclusive, will be controlled over conductor 46 in the same manner as tubes 51 to 55 are controlled, but independently of tubes 51 to 55 and solely under the control of switch arm 31. Thus as switch arm 31 remains on one of the contacts in bank 32 while switch arm 23 traverses all of the contacts in bank 24, tubes 91 to 95, inclusive, will remain in a steady condition as determined by the particular contact of bank 32 engaged by switch arm 31 while tubes 51 to 55 go through a complete cycle of operation. It should be noted that with reference to either set of the electron discharge tubes the particular contact engaged by the switch arm determines the number of tubes that are rendered conductive and that none of the tubes is dependent for its operation upon the operation of another of the tubes so that the switch arms 23 and 31 may be operated in either direction and tubes will be successively rendered conductive or successively cut off in the reverse direction depending solely upon the direction of rotation of the switch arm.

The armature of relay 85 is connected to the positive terminal of battery 86, the negative terminal of which is connected to ground. The left-hand contact of relay 85 is connected to the armature of relay 84, the left-hand contact of relay 84 is connected to the armature of relay 83, the left-hand contact of relay 83 is connected to the armature of relay 82, and the left-hand contact of relay 82 is connected to the armature of relay 81. The left-hand contact of relay 81 is connected over bus bar conductor 87 extending into Fig. 2 to one terminal of each of ten lamps in a bank of one hundred lamps 88 shown in Fig. 2. The particular group of ten lamps to which bus bar conductor 87 is connected is the extreme left-hand vertical row of lamps in Fig. 2. Thus, with none of the tubes 51 to 55, conductive, and none of the relays 81 to 85 operated, a path will be established from battery 86 over conductor 87 to one terminal of each of the ten lamps in this group.

The armature of relay 105 is connected to the negative terminal of battery 106, the positive terminal of which is connected to ground, this being the opposite of the polarity of battery 86. The left-hand contact of relay 105 is connected to the armature of relay 104, the left-hand contact of relay 104 is connected to the armature of relay 103, the left-hand contact of relay 103 is connected to the armature of relay 102, and the left-hand contact of relay 102 is connected to the armature of relay 101. The left-hand contact of relay 101 is connected by bus bar conductor 107 extending into Fig. 2 to one terminal of each of the ten lamps in the uppermost horizontal row of lamp banks 88. The horizontal bus bar conductor 107 of lamp bank 88 connects to the opposite terminal of the lamp in the upper left-hand corner from that to which the vertical bus bar conductor 87 is connected so that with the switch arms 23 and 31 at the transmitting station engaging their zero contacts, all of the electron discharge tubes at the receiving station are non-conductive, relays 81 to 85 and 101 to 105 are all operated to their left-hand contacts under the control of their biasing windings and the circuit of the lamp in the upper left-hand corner is completed so that the lamp is lighted. This lamp represents .00 reading of the optical instrument.

The right-hand contact of relay 85 is connected by bus bar conductor 89 extending into Fig. 2 to one terminal of each lamp in the sixth vertical row counting from the left. The right-hand contact of relay 105 is connected by bus bar conductor 109 extending into Fig. 2 to one terminal of each of the ten lamps in the sixth horizontal row counting from the top. With switch arm 23 engaging contact 5 of bank 24 and switch arm 31 engaging the zero contact of bank 32, all of the tubes 51 to 55 will be conductive, all of the relays 81 to 85 will be operated, none of the tubes 91 to 95 will be conductive, none of the relays 101 to 105 will be operated and a circuit will be completed from battery 86 over conductor 89, the sixth lamp in the uppermost row of bank 88, conductor 107 and the back contacts and armatures of all of the relays 101 to 105, inclusive, to battery 106 to cause the lamp to be lighted. This lamp represents a reading .05 of the optical instrument at the transmitting station, all of the lamps in the uppermost horizontal row representing zero value of the tenths digit and all of the lamps in the sixth vertical row counting from the left representing a value 5 for the hundredths digit. With a reverse condition of the switch arms 23 and 31, namely, switch arm 23 engaging the zero contact of bank 24 and switch arm 31 engaging contact 5 of bank 32, none of the relays 81 to 85 will be operated, all of the relays 101 to 105 will be operated, and the circuit of the extreme left-hand lamp in the sixth horizontal row of lamps will be completed and the lamp will be lighted. Since the extreme left-hand vertical row of lamps represent zero value of the hundredths digit and the sixth horizontal row represents the value 5 for the tenths digit, the lighting of the particular lamp will represent a .50 reading of the optical instrument at the transmitting station. As a further example, when both of the switch arms at the transmitting station engage the contacts 5 of their respective banks, the sixth lamp counting from the left in the sixth horizontal row of lamps will be lighted to represent a reading .55 of the optical instrument at the observing station, since the sixth vertical row of lamps counting from the left represents the value 5 of the hundredths digit and the sixth horizontal row counting from the top represents the value 5 of the tenths digit. It will be noted that these four conditions for the lighting of the four lamps previously identified effect the control of the lamps directly through the relays 81 to 85, inclusive, and 101 to 105, inclusive.

The right-hand contacts of the four relays 81, 82, 83 and 84 are connected by conductors 111, 112, 113 and 114, respectively, to the armatures of four counting relays 116, 117, 118 and 119 in Fig. 2. These contacts are also connected through branching conductors 121, 122, 123 and 124, respectively, to the armatures of four additional counting relays 126, 127, 128 and 129. Each of the relays 116 to 119, inclusive, and 126 to 129, inclusive, is a biased polar relay having three operating windings and a biasing winding. Current through the biasing winding of each of these relays is in a direction to drive the single armature of the relay away from the single front or off-normal contact. The three operating windings of each of these relays are so connected that when current flows in any one of the windings, there being no provision for reversal of current in these windings, the magnetic field thereby produced will exceed and oppose the effect of the biasing winding and will cause the single armature to engage the single front contact.

Assuming that the system is in operation and that switch arm 23, at the transmitting station is engaging the zero contact of bank 24, as shown, none of the relays 81 to 85 will be energized and a circuit may be traced from the positive terminal of battery 86, through the armatures and left-hand contacts of the relays 81 to 85 serially, conductor 87, branching conductor 131, the second operating winding of counting relay 129, conductor 132, the third operating winding of counting relay 116, resistor 133 and conductor 134 to the negative terminal of battery 136, the positive terminal of which is connected to ground. Relays 116 and 129 will thus be energized, overcoming the effect of the biasing windings and operating their armatures to the single front contacts. Bus bar conductors 141, 142, 143 and 144 extend from the front contacts of relays 116 to 119, inclusive, to one terminal of each lamp in the second, third, fourth and fifth vertical rows of lamps in bank 88. Similarly, conductors 146, 147, 148 and 149 extend from the front contact of relays 126 to 129, inclusive, to one terminal of each lamp in the seventh, eighth, ninth and tenth vertical rows of lamps. Although relays 116 and 129 may be assumed to be energized at this time, as previously stated, conductive paths are not extended through their armatures to the second and tenth vertical rows of lamps, respectively, because the armatures of relays 81 and 84 are out of engagement with their right-hand contacts from which conductive paths extend to the armatures of relays 116 and 129, respectively. None of the relays 117, 118, 119, 126, 127 and 128 will be energized at this time.

One operating winding of each of the counting relays 116 to 119 and 126 to 129 is shunted by a condenser 150 for the purpose of imparting a slow release characteristic to each relay. The condensers have been shown connected in shunt with the third operating winding of each relay. It makes no difference which operating winding is shunted by a condenser, as the magnetic field produced by the cessation of current through any one of the operating windings of these relays will induce, in the winding which is shunted by the condenser, current which flows to charge the condenser, and the armature will be held while this charging current exceeds the biasing current.

Upon movement of the switch arm 23 from the zero contact to the contact 1 of bank 24, tube 51 becomes conductive and relay 81 operates its armature to the right-hand contact. In leaving the left-hand contact the armature of relay 81 interrupts the previously traced circuit to the lamp in the upper left-hand corner of lamp bank 88 and also interrupts the previously traced circuit through the second winding of relay 129 and through the third winding of relay 116. These relays hold for a short interval due to their shunting condensers 150, and maintain conductive paths through their armatures and front contacts. At its front contact relay 81 completes a circuit over conductor 111, the armature and front contact of relay 116 and over conductor 141 to the second lamp in the upper row which lights to represent optical instrument reading .01 at the transmitting station. The relay also completes a circuit over conductor 111 and through the armature and front contact of relay 116, first winding of that relay, third winding of relay 117, resistor 151 and conductor 134 to the negative terminal of battery 136, over which circuit relay 116 remains operated and relay 117 becomes operated. Since no circuit is completed through an operating winding of relay 129, that relay releases after its characteristic delay interval.

When the switch arm 23 advances to the contact 2 of switch bank 24, tube 52 becomes conductive, tube 51 remaining conductive and relay 82 operates, relay 81 remaining operated. At its left-hand contact relay 82 interrupts the circuit through the armature of relay 81 and conductor 111 so that the second lamp in the upper row is extinguished and the circuit through the first winding of relay 116 and the third winding of relay 117 is interrupted. At its right-hand contact the relay 82 completes a circuit over conductor 112, armature and front contact of relay 117 and conductor 142 to the third lamp in the upper row which lights and also through the first winding of relay 117, second winding of relay 116, third winding of relay 118, resistor 152 and conductor 134 to the negative terminal of battery 136 whereby relay 118 becomes energized and relay 116 is held energized along with relay 117. The lamp which is lighted over the path just traced represents a reading .02 of the optical instrument.

Upon the movement of switch arm 23 to the contact 3 of bank 24, tube 53 will be rendered conductive and relay 83 will be operated. At its left-hand contact, relay 83 interrupts a circuit over conductor 112 and the armature and front contact of relay 117 to the third lamp from the left in the upper row of lamps and also interrupts the circuit through the first winding of relay 117, the second winding of relay 116 and the third winding of relay 118. At its right-hand contact the relay 83 completes a circuit over conductor 113 and the armature and front contact of relay 118 and over conductor 143 to the fourth lamp in the upper row which lights. A circuit is also completed from the front contact of relay 118 through the first winding of that relay, second winding of relay 117, third winding of relay 119, resistor 153 and conductor 134 to the negative terminal of battery 136 so that relays 117 and 118 remain energized, relay 119 becomes energized and relay 116 is released. The lighted lamp represents a reading .03 of the optical instrument.

Upon advancement of the switch arm 23 to the next contact of bank 24, which is contact 4, tube 54 will be activated and relay 84 will be energized to release the circuit over which relays 117, 118 and 119 have been held operated and to complete the circuit for the fifth lamp in the upper row over conductor 114, armature and front contact of relay 119 and conductor 144, and also to complete a circuit through the armature and front contact of relay 119, first winding of that relay, second winding of relay 118, resistor 154 and conductor 134 to the negative terminal of battery 136. It will be noted that in this condition of the apparatus only two of the counting relays, namely, the relays 118 and 119, are energized, whereas when only the relays 81 and 82 were energized relays 116, 117 and 118 were energized and when only the relays 81, 82 and 83 were energized the relays 117, 118 and 119 were energized. The reason for this is that in the next step of the switch arm 23 and energization of the final relay in the series 81 to 85, the circuit of the sixth lamp in the upper row will be completed directly over conductor 89 from the right-hand contact of relay 85 as previously described and not through the armature and front contact of one of the counting relays and it is not necessary for the relay 119 when completing its holding circuit through its armature and front contact to prepare a path for operation of the next lamp in the upper row by energizing the next counting relay.

Suppose now that the direction of rotation of switch arm 23 had been reversed and instead of advancing to the contact 4 it had gone from contact 3 back to contact 2 of bank 24. Under this circumstance tube 54 would not have been activated and tube 53 would have been cut off, releasing relay 83 and leaving only tubes 51 and 52 conductive. The armature of relay 83, upon moving out of engagement with its right-hand contact, interrupts the circuit of the fourth lamp in the upper row of bank 88 and also interrupts the circuit through the first winding of relay 118, the second winding of relay 117 and the third winding of relay 119. The armature of relay 83 in returning to the left-hand contact completes a circuit from the positive terminal of battery 86 through the armature and right-hand contact of relay 82, conductor 112, armature and front contact of relay 117, and conductor 142 for the third lamp in the first horizontal row and also through the armature and front contact of relay 117, first winding of that relay, second winding of relay 116, third winding of relay 118, resistor 152 and conductor 134 to the negative terminal of battery 136. The result of this reversal of switch arm 23 at the transmitting station is that relay 119 has been released and relay 116 has been reenergized in anticipation of continued rotation of switch arm 23 in the reverse direction, to the contact 1 of bank 24. It will be apparent from this that the counting relay circuit is arranged to count in either direction by the preparatory energization of counting relays on either side of a counting relay through which a lamp is being operated in anticipation of the necessity for completing the circuit of a lamp through either one of the prepared relays. In the case of the operation of a lamp through the armature and front contact of relay 119 there is no occasion for preparatorily energizing a relay beyond it because the conductor 89 stands in lieu of a counting relay and is always prepared to operate any of the lamps in the sixth vertical row of bank 88, counting from the left, the circuit being completed solely by the operation of relay 85.

Assuming again clockwise movement of switch arm 23 from contact 4 to contact 5, when relay 85 is operated, in addition to connecting positive battery 86 to one terminal of each lamp in the sixth vertical row, it also completes a circuit through the second winding of relay 119, third winding of relay 126, resistor 156 and conductor 134 to battery 136 to hold relay 119 and to operate relay 126 in preparation for movement of switch arm 23 either to contact 4 or contact 6 of bank 24 at the transmitting station. Under this condition only two of the counting relays are energized, which satisfies the requirement for preparation of a lamp operating circuit on either side of the circuit over which a lamp is operated.

When the movement of switch arm 23 is from contact 5 to contact 6 the condition which existed when switch arm 23 engaged contact 1 of bank 24 is duplicated as far as tubes 51 to 55 and relays 81 to 85 are concerned, the duplication involving cutting off of tubes 52 to 55 and releasing relays 82 to 85. Relay 116 is at this time unoperated, so that no circuit is completed through its armature and front contact, and a lamp operating circuit is traced through conductor 111 from the right-hand contact of relay 81, conductor 121, armature and front contact of relay 126 and conductor 146 to the seventh lamp in the upper horizontal row. Also a circuit is completed through the armature and front contact of relay 126, first winding of that relay, third winding of relay 127, resistor 157, conductor 134 and battery 136 so that relay 127 becomes preparatorily energized and relay 126 remains energized. Only two of the counting relays are required to be energized at this time because in the event that the switch arm 23 moves back to the contact 5, the sixth lamp in the first horizontal row will be operated over conductor 89 without any preparational operation.

As the switch arm 23 advances to contact 7 the next lamp is operated, relays 126 and 127 are held energized through their second and first windings, respectively, and relay 128 is preparatorily energized through its third winding. When the switch arm steps to contact 8 the next, or ninth, lamp in the first horizontal row is energized, relay 126 is released and relay 129 is preparatorily energized.

When the switch arm moves to contact 9, the last contact in the bank, which movement is evidenced by activation of all of the tubes 51 to 55 except tube 55, the circuit of the last lamp in the first horizontal row is completed over conductor 149, relays 128 and 129 are held energized through their second and first windings, respectively, and relay 127 is released. This is again a condition under which only two of the counting relays are energized. The reason for this is that when switch arm 123 advances another step in the same direction it will leave contact 9 and engage the zero contact thus cutting off all of the tubes 51 to 55 and completing a conductive path from battery 86 to the first or extreme left-hand vertical row of lamps, over conductor 87 which stands in lieu of a counting relay and requires no counting relay preparation.

Assuming that the switch arm 23 advances through this additional step, thus returning to the point of beginning, all of the relays 81 to 85 are released so that the circuit through the armature and front contact and first winding of relay 129 and second winding of relay 128 is interrupted. However, a circuit is completed which was traced as part of the initial condition including conductors 87 and 131, second winding of relay 129, conductor 132, third winding of relay 116, resistor 133 and conductor 134 to battery 136 so that relay 129 will be held energized and relay 116 will be preparatorily energized. Under this condition only two of the counting relays are energized and these occupy sequential positions on either side of conductor 87 so that the preparational conditions for operation of a lamp in the second vertical row or in the last vertical row are satisfied.

Up to this point the description has encompassed a complete cycle of rotation of switch arm 23 across the bank of contacts 24 with the additional description of the operation occurring upon reversal of the direction of rotation of the switch arm. It has been assumed that the switch arm 31 remained on the zero contact of bank 32, which it would do until the switch arm 23 moves from contact 9 to the zero contact of bank 24 or, reversely, from contact 0 to contact 9. Accordingly, conductor 107 remained connected to the negative terminal of battery 106 and the lamps in the upper horizontal row became lighted and extinguished in succession, these lamps representing readings of the optical instrument at the transmitting station of .00 to .09. By virtue of the intermittently operable gearing between the switch arms 23 and 31 the switch arm 31 advances from the zero contact to contact 1 of bank 32, upon movement of switch arm 23 from contact 9 to the zero contact. This causes tube 91 to become conductive and relay 101 to be operated. The right-hand contacts of relays 101, 102, 103 and 104 are connected by conductors 161, 162, 163 and 164, respectively, extending from Fig. 1 through Fig. 2 into Fig. 3 to the armatures of counting relays 166, 167, 168 and 169 and also to the armatures of counting relays 176, 177, 178 and 179, respectively. The counting relays in Fig. 3 may be identical with those in Fig. 2 having three operating windings and a biasing winding. Due to the fact that battery 106 in Fig. 1 from which the counting relays 166, 167, 168, 169, 176, 177, 178 and 179 in Fig. 3 become energized is poled oppositely from battery 86, and battery 131 which represents the other end of the energizing circuits for the counting relays in Fig. 3 is poled oppositely from battery 136, the three windings of each counting relay in Fig. 3 must be connected in the reverse or opposite polar sense in order for any one of these windings upon being energized to cause its armature to engage its front contact. Since it is desired that the biasing windings of these relays shall drive the armatures away from their front contacts, the biasing windings may be connected to biasing batteries in the same polar sense as the relays in Fig. 2. Each of the counting relays in Fig. 3 has a condenser 180 shunted across one of its windings for effecting a slight retardation in the release of the armature for the same purpose as that previously described with reference to the counting relays in Fig. 2. The counting relays in Fig. 3 are controllable by relays 101 to 105, inclusive, in exactly the same manner as the counting relays in Fig. 2 are controlled by the relays 81 to 85, inclusive, and as the operation of the relays in Fig. 2 has been described in detail it will not be repeated with reference to Fig. 3.

Conductors 182 and 183 extend from conductors 107 and 109 in Fig. 2 into Fig. 3 to one terminal of the second winding of relay 179 and to one terminal of the second winding of the relay 169, respectively, for providing circuits for energizing these relays preparatorily when none or all of the tubes 91 to 95, inclusive, are activated and lamp operating circuits are completed over conductors 107 or 109, respectively. The front contacts of counting relays 166, 167, 168, 169, 176, 177, 178 and 179 are connected by conductors 191, 192, 193, 194, 196, 197, 198 and 199, respectively, extending into Fig. 2, to the second, third, fourth, fifth, seventh, eighth, ninth and tenth horizontal rows, respectively, of the lamps in bank 88. These rows of lamps represent values .1 to .9 of readings of the optical instrument at the transmitting station and when any one of them becomes connected to battery 106 through the armature and front contact of its associated counting relay in Fig. 3, it remains so connected until switch arm 23 moves from its zero contact to contact 9 or vice versa. Upon such movement of switch arm 23 battery 106 will become connected to the next horizontal row of lamps either upwardly or downwardly as switch arm 31 moves counter-clockwise to the next contact.

By means of the apparatus hereinbefore described, as the crank which controls the optical instrument at the transmitting station is operated through one revolution, all of the lamps in bank 88 will be lighted and extinguished in succession, the order being from left to right across the horizontal rows and downwardly from one horizontal row to the next in the case of clockwise rotation of switch arms 23 and 31, and, conversely, from right to left across the horizontal rows and upwardly from one horizontal row to the next in the case of counter-clockwise revolution of switch arms 23 and 31. The lower right-hand lamp represents the reading .99 and when this lamp is extinguished in a progression from left to right the lamp in the upper left-hand corner representing the reading .00 is the next lamp to be operated.

The lamps in bank 88 are preferably space discharge lamps containing an ionizable inert gas such as neon. The reason for this preference is that lamps of this type have a negligible time factor in the production and in the quenching of the glow. Lamps having a filament which must be brought to incandescence to produce illumination have an appreciable time factor which might in the case of very rapid operation of switch arm 23, prevent any of the lamps from coming to visual incandescence during the interval that their circuits would be closed and which might produce at other critical, although slower speeds, a moving pattern of two or more lamps at partial incandescence. If desired, the figures expressing the reading which each lamp represents may be displayed adjacent to each lamp or may be imprinted on a translucent screen mounted in front of each lamp so that the figures representing the readings will be displayed by illumination thereof from the lamp behind the screen.

The description of the system as thus far presented is confined to the transmission of readings representing one hundred equal fractional portions of one degree of movement of the optical instrument. Under certain circumstances attendants at transmitting and receiving stations of the type disclosed herein are in constant telephonic communication and the attendant at the transmitting station may keep the attendant at the receiving station informed verbally of the degree reading of the optical instrument, the attendant at the receiving station being informed visually of the fractional degree reading by means of the bank of lamps 88.

If the duties of the attendants at the transmitting and receiving stations should render it undesirable to impose upon them the burden of telephonic transmission and reception of individual degree readings, a degree reading display board may be provided by extension of principles and duplication of apparatus hereinbefore disclosed. For example, at the transmitting station a switch similar to the switches 24 and 32 and having ten contacts, may be geared to the shaft 17 through intermittent motion gearing to advance step by step, one step for each revolution of shaft 17. The ten contacts of this switch may be connected to the terminals and taps of potential divider 41 in the same manner that the contacts of switch banks 24 and 32 are connected. At the receiving station a third set of electron discharge tubes may have their grids connected to be controlled by the third switch, their cathodes connected to the cathodes of tubes 51 to 55, respectively, and their anodes connected through the windings of a third set of five relays to the potential divider points to which the anodes of tubes 51 to 55 are connected. The third set of five relays may be arranged to control a third set of eight counting relays corresponding to the relays shown in Figs. 2 and 3 to control ten lamps. In this way each of the ten lamps would indicate one degree in a zone of ten degrees and thirty-six such zones would make up a complete revolution of optical instruments 11 upon its vertical axis. It would then be necessary for the attendant at the transmitting station to keep the attendant at the receiving station informed only as to the particular ten-degree zone through which the optical instrument was being moved and this would materially reduce the telephone traffic for transmission of information as to degree readings.

If it should be desired to still further reduce the telephonic transmission of degree information this may be accomplished by the provision of a fourth switch having a bank of nine contacts and geared to the third switch by an intermittent motion gearing to advance one contact for each cyclic traversal of the ten contacts of the third switch by its contact arm. The fourth switch would have its nine contacts, numbered 0 to 8, connected to the same terminals and taps of potential divider 41 to which the contacts 0 to 8 of the switches 24 and 32 are connected and its contact arm would be connected to the control electrodes of a fourth set of five electron discharge tubes at the receiving station. The cathodes of the tubes in the fourth set would be connected in the same manner as the cathodes of the tubes shown in Fig. 1 and the anodes would be similarly connected through a fourth set of five relays. Instead of a single bank of ten lamps controlled only by the third set of electron discharge tubes there would be a display board consisting of nine banks of ten lamps in a bank controlled jointly in cross bar or rectangular coordinate fashion by the counting relays controlled by the third set of electron discharge tubes and by a fourth set of counting relays controlled from the fourth set of electron discharge tubes. The fourth set of counting relays could consist of only seven relays which, with the two direct lamp operating paths corresponding to the bus bar conductors 87 and 89 or the bus bar conductors 107 and 109, would provide nine conductive paths for the nine sets of ten lamps per set. This display board of ninety lamps would register degree readings from 00 to 89 which corresponds to one quadrant of the optical instrument. It would then be necessary for the attendant at the transmitting station to inform the attendant at the receiving station only as to the quadrant in which the optical instrument was operating and such information would need to be transmitted only at relatively infrequent intervals. The additional apparatus needed to afford registration of a zone of ten degrees or a zone of ninety degrees has not been shown in the drawings for the reason that it involves no operating principle not already shown in the drawings, would duplicate apparatus already shown in the drawings, and would thereby needlessly expand and complicate the drawings.

Although a specific embodiment of the invention has been shown in the drawings and described in the foregoing specification, it will be understood that the invention is not limited to such specific embodiment but is capable of modification and rearrangement, and substitution of parts and elements without departing from the spirit of the invention and within the scope of the appended claims.

What is claimed is:

1. In a communication system, a station, a potential divider at said station having a plurality of fixed potential derivation points, a switch controllable according to information to be transmitted from said station, said switch having a greater number of contact points than the number of said potential derivation points and having combinations of two contact points connected to certain of said potential derivation points, a second station, a set of electron tubes at said second station comprising a lesser number of tubes than the number of said contact points and controllable by said switch for operation in repetitious progressions for each full cycle of said switch, a counting relay system comprising relays exceeding the number of said tubes and less than the number of said contact points for distinguishing between successive repetitious progressions of operation of said tubes, and an indicator representative of each of said contact points controlled jointly by said tubes and said counting relay system.

2. In a signaling system, a potential divider having a fixed number of potential derivation points, a switch having contacts exceeding the number of said potential derivation points and also having a contactor for traversing said contacts, single conductive connections from some of said potential derivation points to some of said contacts and multiple connections from others of said potential derivation points to others of said contacts in multiples of two contacts per potential derivation point, means for operating said contactor to select potentials in accordance with a characteristic of information to be registered, potential responsive means controlled by said contactor for identifying said potentials, counting means controlled by said potential responsive means for distinguishing between potentials derived from contacts connected in multiple to one potential derivation point, and a register device controlled by said counting means for registering said characteristics of information.

3. In a signaling system, a potential divider having a sequence of fixed potential derivation points, a switch having a sequence of contacts exceeding the number of said potential derivation points and having a contactor for traversing said contacts, conductive connections from said potential derivation points to a corresponding number of said contacts in sequence, conductive connections from certain of said potential derivation point connected contacts to the remainder of said contacts in the same sequential direction, whereby said contactor in traversing said contacts derives the full sequence of potentials afforded by said potential derivation points and repetitiously derives a part of said sequence of potentials, means for operating said contactor in accordance with a characteristic of information to be registered, potential responsive means controlled by said contactor for identifying said potentials, counting means controlled by said potential responsive means for distinguishing between one and the other of said repetitious derivations of potential sequences, and a register device controlled by said counting means for registering said characteristic of information.

4. In a signaling system, a potential divider having a sequence of fixed potential derivation points, a switch having a sequence of contacts exceeding the number of said potential derivation points and having a contactor for traversing said contacts, conductive connections from said potential derivation points to a corresponding number of said contacts in sequence, conductive connections from certain of said potential derivation point connected contacts to the remainder of said contacts in the same sequential direction whereby said contactor in traversing said contacts derives the full sequence of potentials afforded by said potential derivation points and repetitiously derives a part of said sequence of potentials, at least one other switch having like interconnections among its contacts and like connections to said potential divider as said first-mentioned switch, means for simultaneously operating said switches in accordance with different characteristics of information to be transmitted, potential responsive means individual to said switches and controlled thereby for identifying the potentials derived by said contactors, counting means individual to said potential responsive means and controlled thereby for distinguishing between one and the other of said repetitious derivations of potential sequences by each of said switches, and a register device controlled jointly by said counting means for registering said different characteristics of information.

RITA SMITH KINKEAD,
*Administratrix of the Estate of Fullerton S. Kinkead, Deceased.*
GEORGE A. LOCKE.